United States Patent [19]

Feltis et al.

[11] Patent Number: 5,157,575
[45] Date of Patent: Oct. 20, 1992

[54] CIRCUIT BREAKER FAILURE RELAY SYSTEM FOR POWER TRANSMISSION LINE SYSTEMS

[75] Inventors: Mark W. Feltis, Pullman, Wash.; Luther S. Anderson, Moscow, Id.

[73] Assignee: Schweitzer Engineering Laboratories, Inc., Pullman, Wash.

[21] Appl. No.: 699,147

[22] Filed: May 13, 1991

[51] Int. Cl.$^5$ ................................................ H02H 3/00
[52] U.S. Cl. ........................................ 361/63; 361/62; 361/65; 361/94
[58] Field of Search ................ 361/62, 63, 65, 87, 361/93, 94

[56] References Cited

U.S. PATENT DOCUMENTS

| | | | |
|---|---|---|---|
| 4,237,512 | 12/1980 | Forford | 361/87 |
| 4,896,254 | 1/1990 | Bennett | 361/50 |
| 4,967,304 | 10/1990 | Dougherty | 361/31 |

OTHER PUBLICATIONS

Hinman, Walt; Westinghouse Electric Corporation; "Applied Relaying"; 1982.
"Summary Update of Practices on Breaker Failure Protection"; IEEE Transactions on Power Apparatus and Systems, vol. PAS-101, No. 3, Mar. 1982.

Primary Examiner—Steven L. Stephan
Assistant Examiner—Matthew Nguyen
Attorney, Agent, or Firm—Jensen & Puntigam

[57] ABSTRACT

A breaker failure relay circuit is responsive to either a trip signal from a protective relay or a manual trip signal, as well as the current through a circuit breaker protecting a transmission line. The trip signal is applied to an edge triggered timer (28) having selected pickup and dropout times, and is also applied as one input to one OR gate (24). The circuit breaker current is applied to an overcurrent element (34), the output of which is applied to a reset input of the edge triggered timer (28) to reset and disable the timer and also as one input to another OR gate (30). The other input to OR gate (30) is the output of the edge triggered timer (28). The outputs of OR gates (24, 30) are applied to an AND gate (26), the output of which is applied to a second timer (32) and as another input to the one OR gate (24). The output of the timer (32), if and when it occurs, is used as a trip signal for a backup circuit breaker.

9 Claims, 7 Drawing Sheets

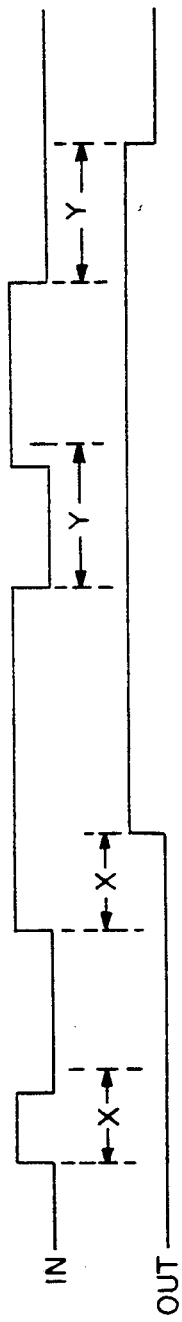
FIG. 7
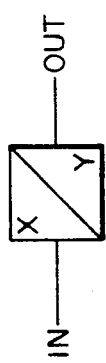
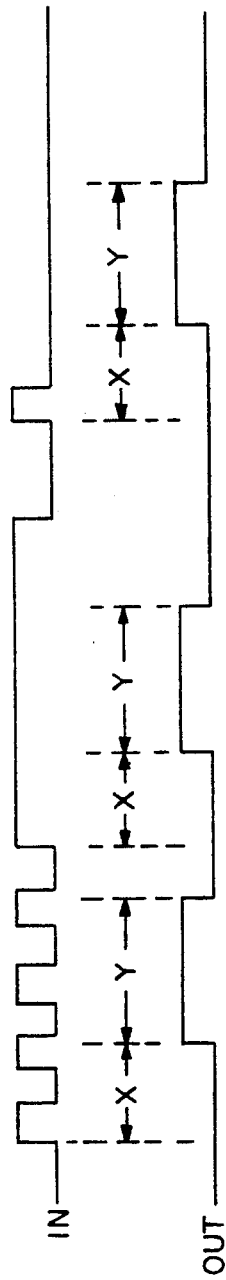
FIG. 8
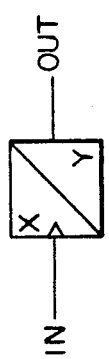

CIRCUIT BREAKER FAILURE RELAY SYSTEM FOR POWER TRANSMISSION LINE SYSTEMS

DESCRIPTION

1. Technical Field

This invention relates generally to protective apparatus for power transmission line systems, and more particularly concerns apparatus for ascertaining a failure in a circuit breaker system for a power line transmission line system and for tripping, i.e. opening, backup circuit breakers.

2. Background of the Invention

As is well known, high voltage power transmission line systems have a complex protection network to protect against various kinds of faults. These protection networks include various devices for recognizing particular current and voltage conditions at various points along the transmission line, as well as protective relays which basically compare and analyze voltage and current values against predetermined reference values. The protective relays may be in the form of electro-mechanical devices, or more recently, computer-type relays, the operation of which are controlled by software. Such software controlled protective relays are typically quite sophisticated in operation, providing a wide variety of fault-determining and reporting functions.

Typically, when a protective relay recognizes an out-of-tolerance condition with respect to any one of various fault conditions, a signal, referred to as a trip signal, is generated which is routed to an appropriately positioned circuit breaker in the transmission line system. Upon receipt of the trip signal, the circuit breaker will open, thereby protecting the transmission line system.

It is recognized, however, that there is a potential for failure in the protection network, in particular the circuit breaker and/or the associated circuitry connecting the protective relay and the circuit breaker. In order to maintain an ability to protect the transmission line system in the event of circuit breaker (or associated circuitry) failure, a backup system is provided involving backup circuit breakers, i.e. either redundant circuit breakers or circuit breakers connected within the power transmission system in overlapping, time-coordinated protection zones such that the opening of selected breakers will result in protection of the particular portion of the transmission line system associated with the failed circuit breaker or the associated circuitry.

The portion of the backup system which determines the failure of a circuit breaker and/or the associated circuitry is generally referred to as a breaker failure relay. The breaker failure relay in operation monitors the operating status of the in service circuit breaker and associated circuitry. The circuit which accomplishes the monitoring function is typically relatively simple. A portion of the IEEE Transactions on Power Apparatus and Systems, Vol. PAS-101, No. 3, March, 1982, discloses several examples of breaker failure protection circuits. Typically, however, those circuits as well as other similar circuits are quite specific and are designed for a particular application. They are not general purpose and are typically restricted in their operational capability. For instance, most of such circuits will not respond to relatively short protective relay trip pulses.

Hence, there is a need for a more general purpose breaker failure relay system, including such a system which is more comprehensive in its ability to detect the failure of a circuit breaker and/or its associated circuitry in a wide variety of transmission line systems.

DISCLOSURE OF THE INVENTION

Accordingly, the present invention includes an edge triggered timer which is responsive to a trip signal, the edge triggered timer having preselected pickup and dropout times and producing in operation a first timer output signal for a first dropout time period after pickup of the edge triggered timer has occurred; an overcurrent element, responsive to current through a power transmission system circuit breaker to produce an overcurrent signal when the current reaches a threshold value; means for resetting said edge triggered timer in response to the presence of the overcurrent signal; a first logic element responsive to said first timer output signal or said first overcurrent output signal to produce a first logic element output signal; a second logic element responsive to the trip signal to produce a second logic element output signal; a third logic element responsive to a coincidence of said first logic element output signal and said second logic element output signal to produce a third logic element output signal; and a second timer means having a selected pickup time and responsive to said third logic element output signal to produce a second timer output signal when said third logic element output signal is present for said selected pickup time, wherein the second timer output signal is useful in tripping a backup circuit breaker for the power transmission line.

BRIEF DESCRIPTION OF THE DRAWINGS

FIGS. 7 and 8 are timing diagrams illustrating the operation of particular timers used in the embodiments of FIGS. 1 and 2.

BEST MODE FOR CARRYING OUT THE INVENTION

Figure 1:
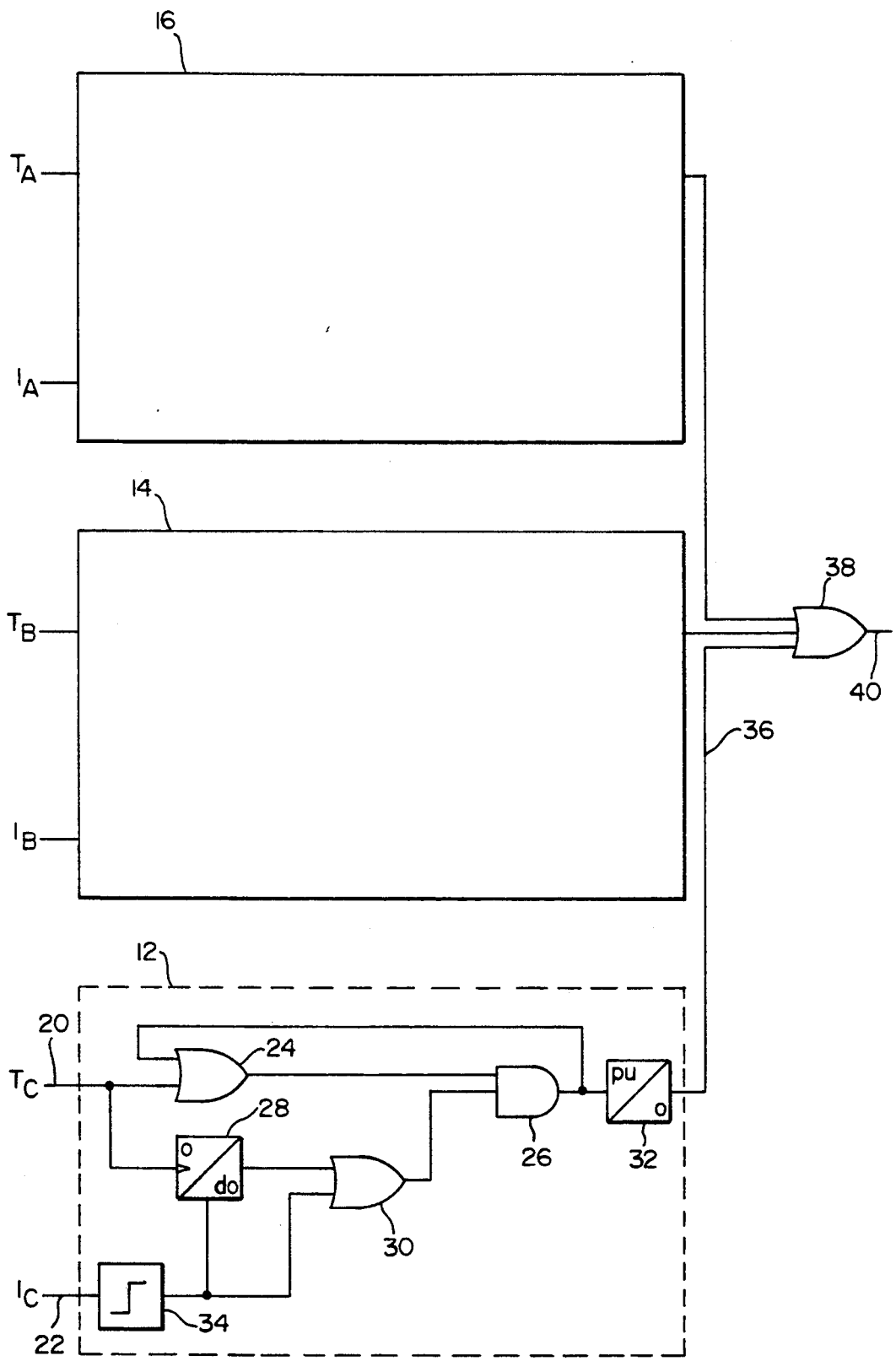
FIG. 1 is a block diagram of one embodiment of the breaker failure relay system of the present invention.

FIG. 1 shows one embodiment of the breaker failure relay system of the present invention. For a three-phase power transmission line, the individual phases are designated, respectively, by the letters A, B and C. Three identical breaker failure relay circuits 12, 14, and 16 are shown, one for each phase. In FIGS. 1–6, the breaker failure relay circuit is shown in complete block diagram form for only phase "C", e.g. circuit 12 in FIG. 1. The other two circuits, e.g. circuits 14 and 16 in FIG. 1, for phases "A" and "B", are represented by large blocks and input and output lines only. It should be understood, however, that each phase has its own breaker failure relay circuit associated therewith.

In the embodiment of FIG. 1, two inputs are provided to circuit 12. One signal input on line 20, shown as $T_C$, represents a trip signal, either from a relay or manually. This trip signal is also applied to the system circuit breaker and would ordinarily result in the opening of the circuit breaker. The other signal input, on line 22, shown as $I_C$, is the current through the system circuit breaker. A trip signal ($T_C$) on line 20 is applied as one input to a first logic OR gate 24. The output of OR gate 24 is applied as one input to an AND gate 26. The trip signal $T_C$ is also applied to an edge-triggered timer 28, which has a pickup time (pu) of zero so that it produces an output upon its initiation by a trip signal for a specified period of time, referred to as the dropout time (do). The output of timer 28 is applied as one input to a second OR gate 30. The output of OR gate 30 is applied as a second input to AND gate 26.

Thus, in operation, upon the occurrence of a trip signal, on line 20, the output from AND gate 26 will go "high". The output from AND gate 26 is applied as another input to OR gate 24, which in essence "latches" the OR gate 24 such that its output is maintained, even if $T_C$ is of short duration and subsequently drops out. It is thus not necessary for $T_C$ to remain asserted in order for the system of FIG. 1 to continue to operate as described below and ultimately produce a trip signal for a backup breaker. The output of AND gate 26 is also applied to a second timer 32 which begins to time immediately when the output of AND gate 26 goes high. Hence, in effect, timer 32 begins to time when a trip signal $T_C$ occurs on line 20. Timer 32 does not, however, provide an output until it times out.

The breaker current signal $I_C$ on input line 22 is applied to a conventional overcurrent element 34, which produces an output only when a selected threshold current level is reached. The output of overcurrent element 34 is applied to the edge triggered timer 28, which results in the resetting of timer 28, and termination of its output. The output from overcurrent element 34 is also applied as a second input to OR gate 30, which will thus continue to maintain a high output to AND gate 26, which in turn will continue to produce a high output applied to timer 32, such that timer 32 continues to run.

In operation, if overcurrent element 34 picks up and remains asserted, following a trip signal on line 20, timer 32 will eventually time out, producing an output on line 36, which will be applied to a system OR gate 38, which also receives output signals from circuits 14 and 16 for phases A and B. An output from any one of the circuits 12,14 or 16 will produce an output signal on line 40. It is the signal on line 40 which is then used to trip the backup circuit breaker(s). If the output from overcurrent element 34 occurs any later than dropout time do following the occurrence of the trip signal $T_C$, then timer 32 will reset.

The dropout time for the edge triggered timer 28 is less than the pickup time pu for timer 32, i.e. the time during which an input must be continuously present prior to an output being produced. In the embodiment of FIG. 1, the difference will be at least two cycles. The pickup time of timer 32 can vary widely, depending upon the particular application. In the embodiment of FIG. 1, the range of pickup time can be selected from 0.25 to 63.75 cycles.

In summary of the operation of the circuit, a trip signal, when it occurs, is applied on line 20 as well as to the system circuit breaker (not shown) which is part of the conventional protection system. If overcurrent element 34 is not picked up (the lack of such a pickup is an indication that the system circuit breaker has operated properly), edge triggered timer 28 will time out prior to the completion of the pickup time of timer 32 and timer 32 will thus not produce any output; no trip signal will hence be applied to the backup breaker.

If overcurrent element 34 does initially pick up (indicating the presence of excessive current continuing through the system circuit breaker) following the occurrence of a trip signal on line 20, but then drops out (because the current through the breaker decreases below the threshold level) before the pickup time of timer 32 is completed, no output from timer 32 will occur and the backup circuit breaker will not be opened. It is only when there is an initial coincidence of a trip signal on line 20 and an overcurrent condition, followed by the overcurrent condition continuing for a pre-established time, that an output from timer 32 occurs, which in turn results in the tripping, i.e. opening, of the backup circuit breaker.

FIGS. 7 and 8 illustrate, respectively, the operation of a conventional timer and an edge triggered timer. FIG. 7 shows a conventional timer, e.g. timer 32 with a pickup time (pu) equal to x, and a dropout time (do) equal to y. There will be no output from the timer until there has been an input present for a time equal to x. Once an output occurs, it continues until the input ceases for a time equal to y. In the case where the pickup time x is equal to zero, the output begins upon the presence of an input and where the dropout time y is equal to zero, the output signal terminates when the input terminates. FIG. 7 clearly illustrates the operation of timer 32 for particular values of x and y.

The operation of an edge triggered timer, such as timer 28, with a pickup time equal to x and a dropout time equal to y is shown in FIG. 8. An output is produced at a time equal to x from the leading edge of any input, regardless of what happens thereafter to the input. The output will continue for a time y at which point it will terminate, regardless of the status of the input during time y. When the pickup time is zero, an output occurs simultaneously with the leading edge of an input signal and continues for a time y. FIG. 8 clearly illustrates the various operational possibilities.

Figure 2:
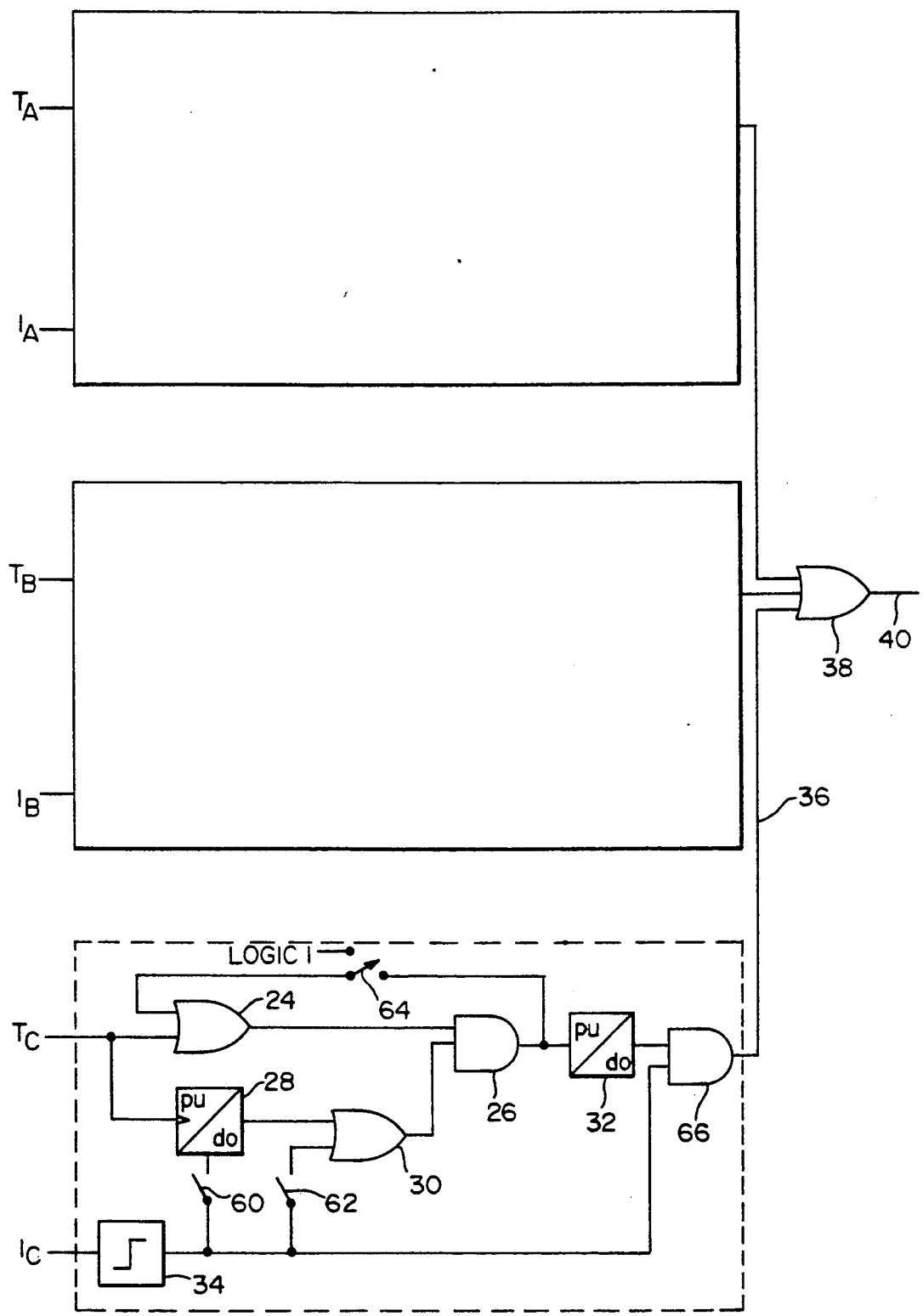
FIG. 2 is a block diagram of another embodiment (general purpose) of the present invention.

FIG. 2 shows a modification of FIG. 1 which is a general purpose breaker failure relay circuit which can be used in various protective system configurations and applications. FIG. 2 is similar to FIG. 1 but further includes a first switch 60 in the line between overcurrent element 34 and edge triggered timer 28, a second switch 62 between the overcurrent element 34 and OR gate 30, and a third switch 64 between AND gate 26 and OR gate 24. Switch 64, in addition to having "open" and "closed" positions like switches 60 and 62, also has a "logic 1" position. When switch 64 is in the logic 1 position, the output of OR gate 24 is always high, i.e. a logic 1. The circuit further includes a second AND gate 66 to which is applied the output from timer 32 and the output of overcurrent element 34. When switches 1, 2 and 3 are closed and edge triggered timer 28 and timer 32 are set with pickup time and dropout times similar to that for the embodiment of FIG. 1, the circuit of FIG. 2 operates in similar fashion as that of FIG. 1. The AND gate 66 is redundant in this circuit configuration but does not effect the overall operation of the circuit in any way.

Figure 3:
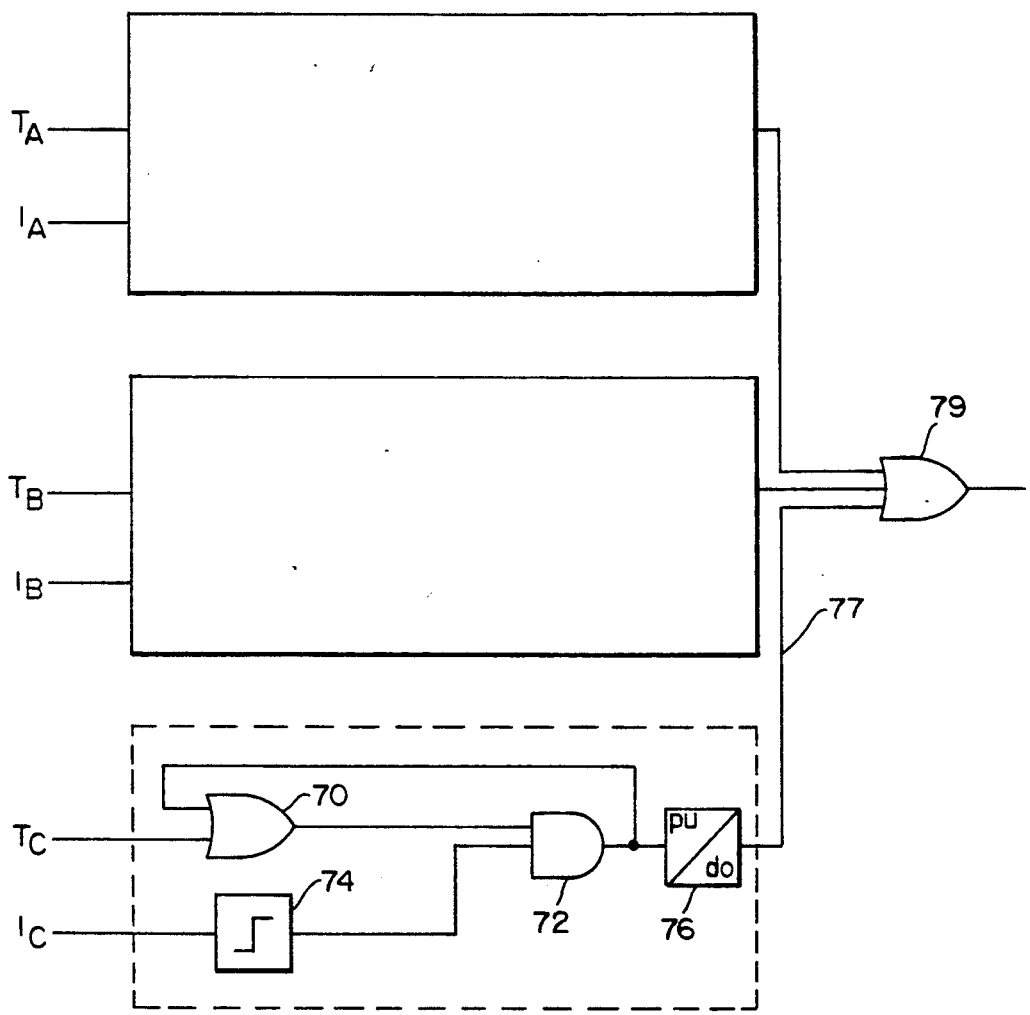
FIG. 3 is a block diagram of one particular known breaker failure relay system which can be implemented with the general purpose embodiment of FIG. 2.

FIG. 3 illustrates one known breaker failure relay circuit which is used in some existing power transmission systems and which can be operationally duplicated by the circuit of FIG. 2. Referring to FIGS. 2 and 3, switches 60, 62, and 64 are closed, and the pickup and dropout times of the edge triggered timer 28 are set to zero, which in effect open circuits that element. OR gate 30 thus in operation becomes in effect a short circuit and AND gate 66 is redundant, such that the configuration of FIG. 2 operates like FIG. 3. In operation of the circuit of FIG. 3, a trip signal is applied to OR gate 70, the output of which is applied to AND gate 72. The current through the breaker is applied to overcurrent element 74, which produces another output to AND gate 72 when the current reaches a selected threshold. The output of AND gate 72 is applied to a second input of OR gate 70 which latches the output of OR gate 70. The output of AND gate 72 is applied to a conventional timer 76. The timer 76 produces an output on line 99 which results in tripping of the back up circuit breaker through OR gate 79 when the input (to the timer 76) is present for a selected time, which in the embodiment shown is in the range of 0.25-63.75 cycles. If the overcurrent element 74 drops out before the pickup time of timer 76, then no output is produced from timer 76 and the backup circuit breaker is not tripped.

Figure 4:
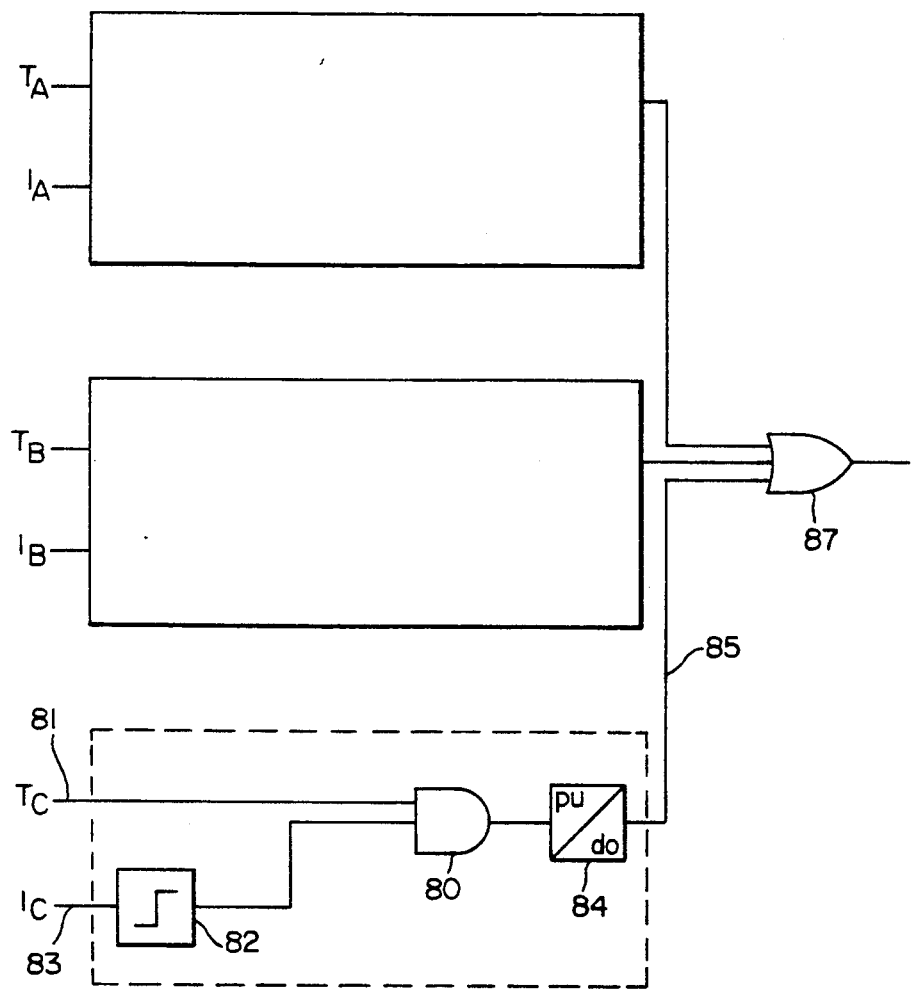
FIG. 4 is a block diagram of another known breaker failure relay system which can be implemented with the general purpose embodiment of FIG. 2.

FIG. 4 shows an even more simplified circuit arrangement which is frequently used in the industry. However, this arrangement should be used only if the trip signal remains asserted until the fault is actually cleared. To implement the operation of the circuit of FIG. 4 with the circuit of FIG. 2, switches 60 and 62 in FIG. 2 are closed, while switch 64 remains open. The pickup and dropout settings of edge triggered timer 28 are both set to zero, which results in timer 28 being in effect an open circuit. With switch 64 open, OR gate 24 operates as a short circuit. OR gate 30 also operates in effect as a short circuit, while AND gate 66 is again redundant. In operation of FIG. 4, AND gate 80 receives directly a trip signal on line 81, as well as an output from overcurrent element 82 if the current through the circuit breaker on line 83 rises above a selected threshold value. The output of AND gate 80 is applied to timer 84, which will produce an output on line 85 when the input is present for the selected pickup time, which in the embodiment shown for FIG. 2 is within the range of 0.25-63.75 cycles. This in turn requires that both the relay signal and the overcurrent element output be simultaneously present for that time. The output on line 85 is applied to an OR gate 87 which produces the backup trip signal. If the breaker current goes below the threshold value or terminates prior to the completion of the pickup time, the input to the timer 84 will terminate and there will be no breaker failure signal.

Figure 5:
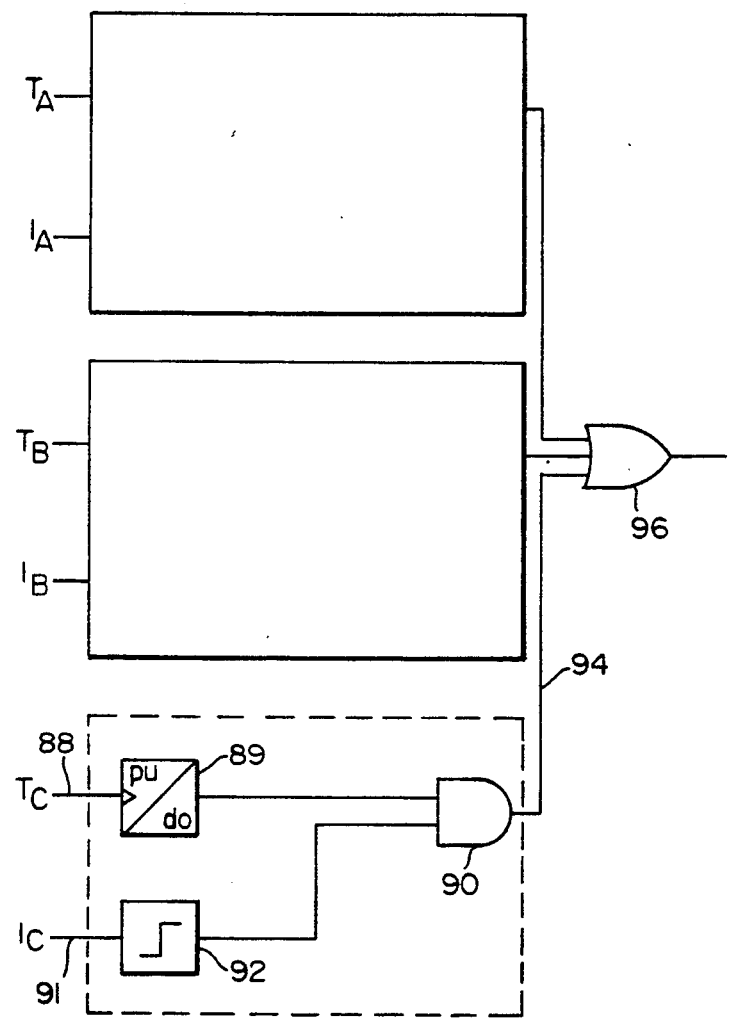
FIG. 5 is a block diagram of still another known breaker failure relay system which can be implemented with the general purpose embodiment of FIG. 2.

FIG. 5 shows a variation which is similar to circuits used in other relays. This is a sensitive arrangement and involves a conservative approach. It is different than the circuits of FIGS. 3 and 4 in that it includes an edge triggered timer but does not include a conventional timer. Referring to FIG. 2, the operation of the circuit of FIG. 5 can be simulated by opening switches 60 and 62 and setting switch 64 to its logic 1 state, as discussed above. The output of OR gate 24 is thus always high. The output of timer 28 thus will always pass through AND gate 26. The pickup and dropout times for the edge triggered timer 28 are set, respectively, to a desired number of cycles, while the pickup time for timer 32 is set to zero, which in essence results in timer 32 appearing operationally as a short circuit for the purpose of producing a backup relay trip signal. In operation of the circuit of FIG. 5, upon the occurrence of a trip signal on line 88, timer 89 will produce an output at the conclusion of the pickup time. This output will last for the amount of the dropout (do) time. The output of timer 89 is applied as one input to AND gate 90. Current through the system circuit breaker will be applied on line 91 to overcurrent element 92, the output of which is applied as another input to AND gate 90. If, following the pickup time of timer 89, but before the dropout time thereof, there is an overcurrent signal for element 92, i.e. a coincidence between the overcurrent signal and the output of timer 89, then an output signal from AND gate 90 will appear on output line 94, which will be applied to OR gate 96, the output of which is a signal which results in the tripping of the backup breaker.

Figure 6:
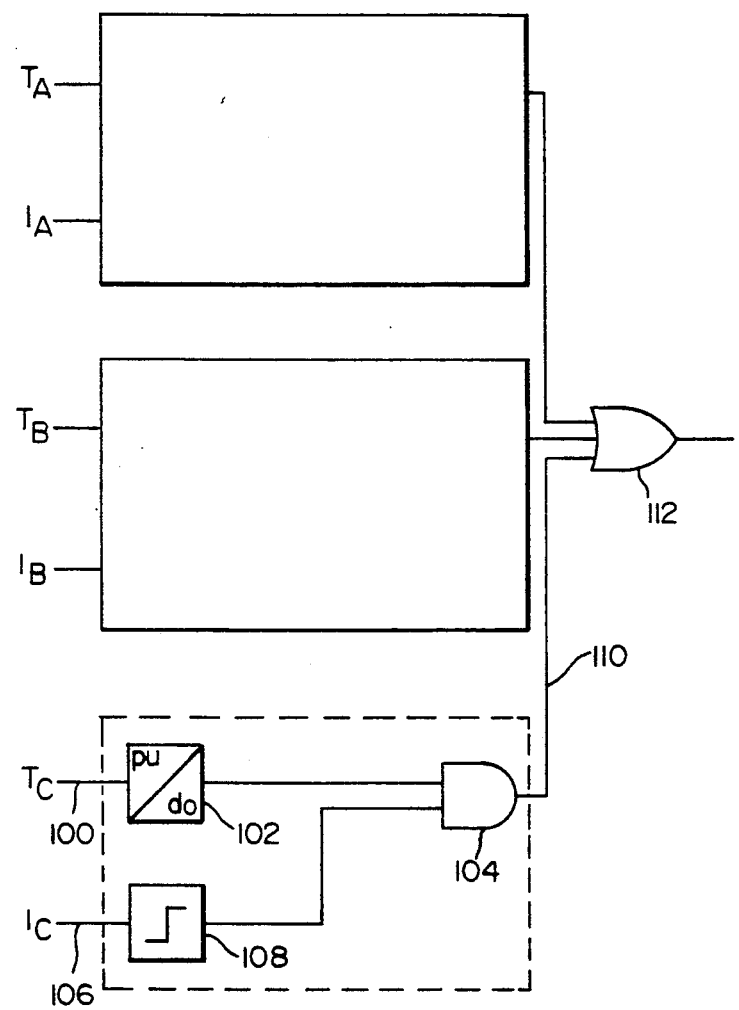
FIG. 6 is a block diagram of a still further known breaker failure relay system which can be implemented with the general purpose embodiment of FIG. 2.

FIG. 6 is another common breaker failure relay configuration capable of being functionally duplicated by the circuit of FIG. 2. In this arrangement, referring again to FIG. 2, switches 60, 62 and 64 are all open. The edge triggered timer 28 has a pickup time of zero and a dropout time of infinity, resulting in the edge triggered timer always having a logic 1, i.e. high, output after a trip signal is received. The output of OR gate 30 is thus likewise always high (logic 1). The trip signal $T_c$ thus will always be able to pass through AND gate 26. Referring to FIG. 6, with respect to its operation, when a trip signal occurs on line 100, it is applied as an input to timer 102, the output of which is applied as one input to AND gate 104. The current through the system circuit breaker on line 106 is applied to overcurrent element 108, the output of which is applied as another input to AND gate 104. The pickup time of timer 94 is set within the range of 0.25-63.75 cycles. In operation, there will be no output from timer 102 until the selected pickup time has passed after the trip signal is initiated. If the trip signal drops out prior to a signal from overcurrent element 108 (timer 102 will reset), or if the signal from overcurrent element 108 drops out prior to the completion of the pickup time of timer 102, there will be no coincidence of input signals at AND gate 104, and hence, no breaker failure trip signal. A coincidence of an output from timer 102 and a signal from overcurrent element 108 will result in an output on line 110 from AND gate 104, which will be applied to OR gate 112. The output from OR gate 112 will be used to trip the backup breaker.

Hence, a new breaker failure relay system has been disclosed, including one circuit which is general purpose in operation. The disclosed embodiments are designed to provide breaker failure protection in various protection configurations, using both breaker current and a conventional trip signal, such as from a protective relay. It should be understood that the present invention can be used in a wide variety of power transmission system substation arrangements and configurations.

Although a preferred embodiment of the invention has been disclosed herein for the purposes of illustration, it should be understood that various changes, modifications and substitutions may be incorporated in such embodiment without departing from the spirit of the invention which is defined by the claims which follow:

We claim:

1. A circuit breaker failure relay apparatus for use with a power transmission line having a system circuit breaker associated therewith which in normal operation opens in response to a trip signal indicative of a fault on the transmission line, comprising:

an edge triggered timer, responsive to a trip signal, having preselected pickup and dropout times and producing a first timer output signal for a first dropout time period after the pickup of the edge triggered timer has occurred;

an overcurrent element, responsive to current through the system circuit breaker to produce an overcurrent signal when the current reaches a threshold value;

means for resetting said edge triggered timer in response to the presence of said overcurrent signal;

a first logic element responsive to the trip signal to produce a first logic element output signal;

a second logic element responsive to said first timer output signal or said first overcurrent output signal to produce a second logic element output signal;

a third logic element responsive to a coincidence of said first logic element output signal and second logic element output signal to produce a third logic element output signal; and second timer means having a selected pickup time and responsive to said third logic element output signal to produce a second timer output signal when said third logic element output signal is present for said selected pickup time, wherein the second timer output signal is useful in tripping a backup circuit breaker for the power transmission line.

2. An apparatus of claim 1 wherein the first and second logic elements are first and second OR gates, respectively, and the third logic element is an AND gate.

3. An apparatus of claim 1, wherein the dropout time of the edge triggered timer is less than the pickup time of the second timer.

4. An apparatus of claim 1 wherein the second timer resets if the third logic signal terminates prior to passage of the pickup time of the second timer.

5. An apparatus of claim 1, wherein the pickup time of the second timer is selectable, within the range of 0.25–63.75 cycles.

6. An apparatus of claim 2, including means connecting the output of the AND gate to an input of the first OR gate, thereby latching the first OR gate.

7. An apparatus of claim 6, including first switch means between said overcurrent element and said resetting means, second switch means between said overcurrent element and said second OR gate, and third switch means in said means connecting the AND gate and the first OR gate, wherein the first and second switch means have open and closed states and wherein the third switch means has open and closed states and a logic 1 state.

8. An apparatus of claim 7, including a second AND gate responsive to said overcurrent element and said second timer means.

9. An apparatus of claim 1, wherein the power transmission line is three phase, and wherein the apparatus includes a combination of said edge triggered timer, said overcurrent element, said resetting means, said first, second and third logic elements and said second timer means for each phase of current on the power transmission line and an OR gate responsive to the second timer outputs of all three combinations.

* * * * *